(12) United States Patent
Banerjea

(10) Patent No.: US 8,345,607 B2
(45) Date of Patent: Jan. 1, 2013

(54) COEXISTENCE AND COLLOCATION OF REMOTE NETWORK AND LOCAL NETWORK RADIOS

(75) Inventor: Raja Banerjea, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 891 days.

(21) Appl. No.: 12/396,844

(22) Filed: Mar. 3, 2009

(65) Prior Publication Data

US 2009/0225717 A1 Sep. 10, 2009

Related U.S. Application Data

(60) Provisional application No. 61/068,752, filed on Mar. 10, 2008.

(51) Int. Cl.
*H04J 1/00* (2006.01)
(52) U.S. Cl. .......... 370/329; 370/343
(58) Field of Classification Search .......... 370/328, 370/329, 395.4, 445, 465–467; 455/422.1, 455/445, 448, 552.1, 553.1, 562.1
See application file for complete search history.

(56) References Cited

U.S. PATENT DOCUMENTS

| | | | | |
|---|---|---|---|---|
| 6,600,726 | B1 * | 7/2003 | Nevo et al. | 370/278 |
| 2001/0010689 | A1 * | 8/2001 | Awater et al. | 370/344 |
| 2004/0048577 | A1 * | 3/2004 | Godfrey et al. | 455/67.11 |
| 2005/0007979 | A1 | 1/2005 | Tsien et al. | |
| 2007/0183338 | A1 | 8/2007 | Singh | |
| 2007/0232358 | A1 * | 10/2007 | Sherman | 455/560 |
| 2007/0238482 | A1 * | 10/2007 | Rayzman et al. | 455/552.1 |
| 2007/0275746 | A1 * | 11/2007 | Bitran | 455/509 |
| 2007/0298721 | A1 * | 12/2007 | Mishra et al. | 455/66.1 |
| 2008/0062919 | A1 * | 3/2008 | Chen et al. | 370/329 |
| 2008/0102885 | A1 * | 5/2008 | Tu et al. | 455/553.1 |
| 2008/0227488 | A1 * | 9/2008 | Zhu et al. | 455/553.1 |
| 2008/0247445 | A1 * | 10/2008 | Guo et al. | 375/220 |

(Continued)

FOREIGN PATENT DOCUMENTS

FR A-0 892 568 1/1999

(Continued)

OTHER PUBLICATIONS

Notification of Transmittal of the International Search Report and the Written Opinion of the International Searching Authority, or the Declaration dated Sep. 28, 2009 in reference to PCT/US2009/036106.

(Continued)

*Primary Examiner* — Ian N Moore
*Assistant Examiner* — Thai Nguyen

(57) ABSTRACT

A coexistent communication system of a first network device includes a remote network radio. The remote network radio has a remote transmission distance, operates based on remote network protocols, and communicates with a base station using a first communication link corresponding to a first frequency band. A local network radio has a local transmission distance and is collocated with the remote network radio. The local network radio operates based on local network protocols that are different than the remote network protocols and communicates with a second network device using a second communication link corresponding to a second frequency band. A control module at least one of schedules communication on the first communication link and the second communication link and adjusts a transmission parameter of one of the remote network radio and the local network radio. Transmission distance of the remote network radio is greater than transmission distance of the local network radio.

19 Claims, 11 Drawing Sheets

U.S. PATENT DOCUMENTS

2009/0040937 A1* 2/2009 Xhafa et al. .................. 370/252
2009/0103474 A1* 4/2009 Lu et al. ........................ 370/328

FOREIGN PATENT DOCUMENTS

JP         A-1 876 764         1/2008

OTHER PUBLICATIONS

IEEE Std 802.11a-1999 (Supplement to IEEE Std 802.11-1999); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band; LAN/MAN Standards Committee of the IEEE Computer Society; Sep. 16, 1999; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.11g/D8.2, Apr. 2003 (Supplement to ANSI/IEEE Std 802.11 1999 (Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE 802.11n; IEEE 802.11-04/0889r6; IEEE P802.11 Wireless LANs; TGn Sync Proposal Technical Specification; Syed Aon Mujtaba; Agere Systems Inc.; May 18, 2005; 131 pages.

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; Aug. 20, 1999; 531 pages.

IEEE Std 802.16-2004 (Revision of IEEE Std 802.16-2001) IEEE Standard for Local and metropolitan area networks; Part 16: Air Interface for Fixed Broadband Wireless Access Systems; IEEE Computer Society and the IEEE Microwave Theory and Techniques Society; Oct. 1, 2004; 893 pages.

IEEE Std 802.15.1™—2005 (Revision of IEEE Std 802.15.1-2002); IEEE Standard for Information technology—Telecommunications and information exchange between systems—Local and metropolitan area networks—Specific requirements—Part 15.1: Wireless medium access control (MAC) and physical layer (PHY) specifications for wireless personal area networks (WPANs); LAN/MAN Standards Committee of the IEEE Computer Society; Jun. 14, 2005; 598 pages.

IEEE Std 802.15.2™-2003; IEEE Recommended Practice for Information technology—Telecommunications and information exchange between systems—Local and metropolitan area networks—Specific requirements—Part 15.2: Coexistence of Wireless Personal Area Networks with Other Wireless Devices Operating in Unlicensed Frequency Bands; LAN/MAN Standards Committee of the IEEE Computer Society; Aug. 28, 2003; 126 pages.

* cited by examiner

| Coex Local | RN Radio of Local SRD TX | RN Radio of Local SRD RX |
|---|---|---|
| LN Radio of Local SRD TX | LN and RN TX | LN TX or RN RX |
| LN Radio of Local SRD RX | LN RX or RN TX | LN and RN RX |

FIG. 6

| Coex Remote | RN Radio of Remote SRD TX | RN Radio of Remote SRD RX |
|---|---|---|
| LN Radio of Remote SRD TX to Local SRD | LN and RN TX | LN TX or RN RX |
| LN Radio of Remote SRD RX from Local SRD | LN RX or RN TX | LN and RN RX |

FIG. 7

COEXISTENCE AND COLLOCATION OF REMOTE NETWORK AND LOCAL NETWORK RADIOS

CROSS-REFERENCE TO RELATED APPLICATIONS

This application claims the benefit of U.S. Provisional Application No. 61/068,752, filed on Mar. 10, 2008. The disclosure of the above application is incorporated herein by reference in its entirety.

FIELD

The present disclosure relates to wireless cellular broadband communication and wireless local area network communication.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Worldwide interoperability for microwave access (WiMAX) is a wireless cellular broadband communication technology that is used for communication between a mobile station (MS) and a base station (BS). Bluetooth IEEE 802.11 medium access control (MAC) layer/physical (PHY) layer (AMP) is an advanced Bluetooth technology that is used in a wireless local area network (WLAN) for communication between devices, such as computers, in a limited area. Communication within a WLAN may include the use of one or more access points.

Systems that use WiMAX include IEEE 802.16 MAC and PHY devices and are time-division duplex (TDD) systems, which may operate in licensed frequency bands of, for example, 2.3-2.4 GHz and 2.5-2.7 GHz. A TDD system refers to a system that transmits, receives, and has corresponding schedules for downlink (DL) and uplink (UL) signals over a particular channel. A WiMAX system is a scheduled system with a corresponding DL and UL ratio, which may be configured. In a WiMAX system downlink and uplink transmissions between a BS and a MS are scheduled by the BS. WiMAX is used for Internet protocol (IP) traffic including voice and data traffic between the BS and the MS.

Systems that use Bluetooth IEEE 802.11 AMP may include IEEE 802.11 radios and a Bluetooth radio. The IEEE 802.11 radios include MAC and PHY devices that operate based on IEEE 802.11 protocols and transmit and receive user data. The Bluetooth radio is used for station discovery, connection setup and station association. By leveraging IEEE 802.11 devices and protocols, Bluetooth IEEE 802.11 AMP systems provide improved throughput relative to a traditional Bluetooth radio. A traditional Bluetooth radio is referred to as basic rate or extended data rate (BR/EDR) radio. IEEE 802.11 radios are unscheduled systems in that DL and UL transmissions are not scheduled by a remote device or a BS. Data integrity is provided through acknowledgement (ACK) signals.

SUMMARY

In one embodiment, a coexistent communication system of a first network device is provided. The system includes a remote network radio that has a remote transmission distance, that operates based on remote network protocols, and that communicates with a base station using a first communication link corresponding to a first frequency band. A local network radio is collocated with the remote network radio. The local network radio has a local transmission distance, operates based on local network protocols that are different than the remote network protocols, and communicates with a second network device using a second communication link corresponding to a second frequency band. A control module at least one of schedules communication on the first communication link and the second communication link and adjusts a transmission parameter of one of the remote network radio and the local network radio. Transmission distance of the remote network radio is greater than transmission distance of the local network radio.

In other features, the first frequency band includes a Federal Communication Commission band and the second band includes an Industrial, Scientific and Medical band.

In other features, the remote network radio communicates with the base station using a first channel. The local network radio communicates with the second network device using a second channel. The local network radio signals the second network device to communicate with the first network device using a third channel that is different than the second channel based on the remote network radio using the first channel.

In other features, the remote network radio communicates with the base station using a first channel. The local network radio communicates with the second network device using a second channel. The local network radio communicates with the second network device using a third channel with a frequency that is higher than frequency of the second channel when the frequency of the second channel is higher than the frequency of the first channel.

In other features, the remote network radio communicates with the base station using a first channel. The local network radio communicates with the second network device using a second channel. The local network radio communicates with the second network device using a third channel with a frequency that is lower than frequency of the second channel when the frequency of the second channel is lower than the frequency of the first channel.

In other features, the control module permits the local network radio to receive packets from the second network device when the remote network radio is receiving packets from the base station. In other features, the control module permits the local network radio to transmit packets to the second network device when the remote network radio is transmitting packets to the base station. In other features, the control module prevents the remote network radio from transmitting packets to the base station when the local network radio is receiving packets from the second network device.

In other features, the control module determines precedent between the remote network radio and the local network radio based on quality of service values for the remote network radio and for the local network radio. In other features, the control module prevents the local network radio from transmitting packets to the second network device when the remote network radio receives packets from the base station.

In other features, the second frequency band is at least one of adjacent to the first frequency band and includes a channel in the first frequency band. In other features, the remote network radio communicates with the base station using a first channel and the local network radio communicates with the second network device using the first channel. In other features, the local network radio communicates with the second network device using a second channel instead of the first channel based on the remote network radio communicating with the base station using the first channel. In other features, the remote network radio communicates with the base station using a second channel instead of the first channel based on the local network radio communicating with the second network device using the first channel.

In other features, the remote network radio communicates with the base station based on an activity report that indicates communication between the local network radio and the second network device. In other features, the local network radio communicates with the second network device based on an activity report that indicates communication between the remote network radio and the base station.

In other features, the local network radio receives packets from the second network device based on reception of a request-to-send packet from the second network device and status of the remote network radio. In other features, the local network radio receives the request-to-send packet when the remote network radio is receiving remote network packets and does not receive the request-to-send packet when the remote network radio is transmitting remote network packets. In other features, the local network radio refrains from transmitting a clear-to-send signal when the request-to-send signal is received. In other features, the local network radio refrains from transmitting a clear-to-send signal when the remote network radio is at least one of transmitting and receiving remote network packets.

In other features, the local network radio transmits a clear-to-send signal to the second network device based on whether the remote network radio is at least one of transmit and receive remote network packets within a predetermined period of time. In other features, the local network radio transmits a clear-to-send signal to the second network device based on reception of remote network packets by the remote network radio. In other features, the local network radio transmits a clear-to-send signal to the second network device based on the remote network radio receiving remote network packets within a predetermined period of time.

In other features, the local network radio transmits a clear-to-send signal to the second network device based on the remote network radio transmitting remote network packets in a predetermined period of time.

In other features, each of the first network device and the second network device include at least one of a service request device and a mobile station. In other features, the coexistent interface includes memory that stores an arbitration table. An arbitration control module controls communication timing between the remote network radio and the base station and between the local network radio and the second network device based on the arbitration table.

In other features, the arbitration control module schedules communication of one of the remote network radio and the local network radio. The communication is scheduled based on at least one of transmission status and reception status of the other one of the remote network radio and the local network radio.

In other features, the coexistent communication system further includes a coexistent interface that is connected between the remote network radio and the local network radio. The remote network radio communicates with the base station based on a permission signal received from the local network radio via the coexistent interface.

In other features, the coexistent communication system further includes a coexistent interface connected between the remote network radio and the local network radio. The local network radio communicates with the second network device based on a permission signal received from the remote network radio via the coexistent interface.

In other features, one of the remote network radio and the local network radio adjusts a transmission power level based on a communication parameter of the other one of the remote network radio and the local network radio. In other features, the remote network radio and the local network radio are implemented on the same integrated circuit.

In other features, the remote network radio operates using at least one of worldwide interoperability for microwave access protocols, 3rd generation partnership project protocols and long term evolution protocols and the local network radio operates using at least one of Bluetooth protocols, IEEE 802.11 medium access control layer/physical layer network (AMP) protocols, and wireless local area network protocols. In other features, the remote network radio communicates with the base station using cellular broadband protocols.

In other features, a system is provided that includes the first network device with the coexistent communication system and the second network device. The second network device communicates with the first network device based on communication between the remote network radio and the base station.

In other features, the local network radio transmits a clear-to-send signal to the second network device based on at least one of: the remote network radio receiving remote network signals from the base station; the remote network radio receiving remote network signals from the base station within a first predetermined period; and the remote network radio transmitting remote network signals to the base station within a second predetermined period.

In other features, the control module controls communication timing between the remote network radio and the base station and between the local network radio and the second network device based on a first arbitration table. The second network device controls communication timing between the first network device and the second network device based on a second arbitration table that is based on collocation of a remote network radio and a local network radio of the second network device.

In still other features, the systems and methods described above are implemented by a computer program executed by one or more processors. The computer program can reside on a computer readable medium such as but not limited to memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 6 is an exemplary local side arbitration table in accordance with an embodiment of the present disclosure;

FIG. 7 is an exemplary remote side arbitration table in accordance with an embodiment of the present disclosure;

DESCRIPTION

Figure 1:
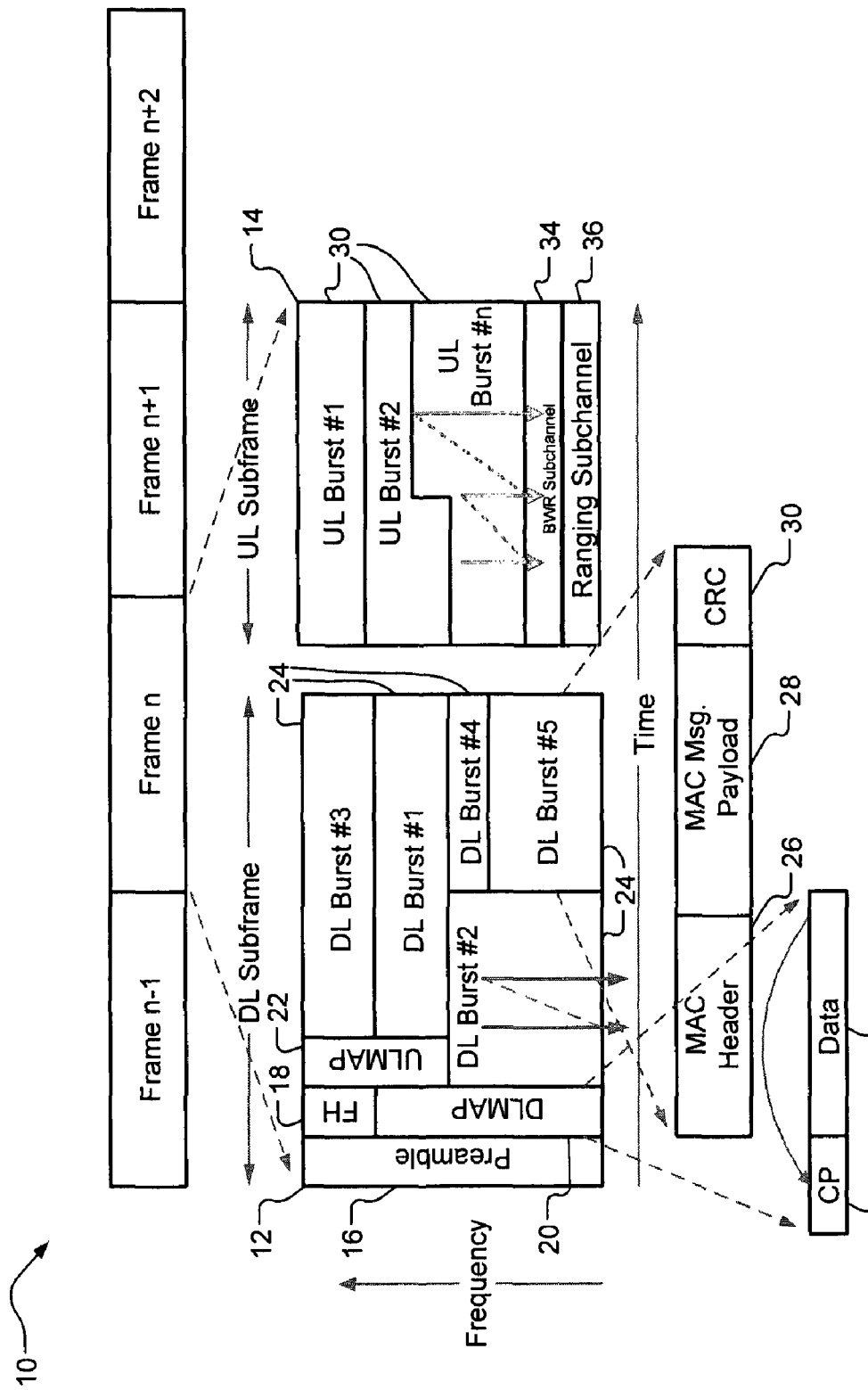
FIG. 1 is an exemplary WiMAX frame structure diagram.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

In the following description, a service request device (SRD) may refer to user equipment (UE), a mobile node, a non-mobile station, a subscriber station, a mobile station, a multi-radio terminal, etc. A SRD may include equipment of an end user, such as a processor, a radio interface adaptor, etc. An SRD may include a mobile network device, a cellular phone, a personal data assistant (PDA), a computer, etc. An SRD may communicate with a BS, may directly and/or indirectly access an Internet, or may communicate with another SRD. When in communication with the Internet or another SRD, the communication may include an AP. An SRD may include one or more radios with respective transmitters, receivers, and/or transceivers.

An SRD may request various real-time and non-real-time services, such as Web browsing, voice over Internet phone (VoIP), electronic mail (email), file transfer protocol (ftp) applications, and real-time IP multimedia, as well as conversational and streaming services.

Also, in the following description various networks and network devices are disclosed. A network device may refer to a UE, a base station, a SRD, an access point (AP), etc. A network device may refer to a control module, a transceiver, a protocol stack of a transceiver or a communication layer, such as a PHY layer, a MAC layer, etc. Although a particular number of each network device is shown, any number of each network device may be included. Each of the network devices may be considered a remote network device relative to another network device.

In addition, in the following description various variable labels are disclosed. The variable labels are provided as examples only. The variable labels are arbitrarily provided and may each be used to identify or refer to different items. For example, the variable label N may be used to refer to an integer value when identifying a number of transmit symbols or as an integer value when identifying a number of receive symbols.

Furthermore, in the following description, the terms coexistence and coexistent refers to the ability of a first system, device, or radio to perform a task in a given shared environment where a second system device, or radio has an ability to perform a task. The second system, device or radio may use the same set of rules as the first system, device or radio when performing a respective task. A set of rules may include, for example, permitted transmission and reception times for coexistent and/or collocated radios, interference and/or activity reporting requirements, etc. Interference and activity reporting is described in detail below.

Moreover, in the following description, the term collocated may refer to devices that are located within a network device and/or within a close proximity of each other. For example, radios of a network device may be considered collocated as the radios are located in a single network device, located on a single printed circuit board (PCB), and/or implemented as an integrated circuit. Network devices or radios may be considered collocated when the network devices or radios are within approximately 0.5 meters of each other.

Referring now to FIG. 1, an exemplary WiMAX frame structure 10 is shown. The frame structure 10 may be an orthogonal frequency-division multiple access (OFDMA) frame structure for a time division duplex (TDD) system. Frames n−1, n, n+1 and n+2 are shown, where n is an integer. The structure of frame n, as shown, includes a downlink (DL) subframe 12 and an uplink (UL) subframe 14. The DL and UL subframes have corresponding DL and UL symbols.

The DL subframe 12 includes a preamble 16 followed by a frame header (FH) 18, followed by a DL map 20 and an UL map 22. The FH 18 may include a frequency correction burst value. The DL and UL maps 20, 22 are followed by DL bursts 24, shown as DL bursts$_{1-5}$. A DL burst may include a MAC header 26, a MAC message payload 28, and cyclical redundancy check (CRC) bits 30. The preamble 16 and FH 18 are used for synchronization between a mobile station (MS) and a base station (BS). The preamble 16 may include one or more symbols that are used for BS identification, timing synchronization, and channel estimation at the MS. The symbols may be generated using a set of binary pseudo random number (PN) sequences, referred to as a preamble ID.

The FCH is used for phase and frequency timing between the MS and the BS. The DL and UL maps 20, 22 provide sub-channel allocations and control information for the DL and UL sub-frames 12, 14. The DL and UL maps 12, 14 include frame numbers, number of zones, location identifications and content type of the DL bursts 24 and/or UL bursts 30 of the UL subframe 14. Each of the DL and UL bursts 24, 30 may be allocated by a symbol offset, a sub-channel offset, an associated number of sub-channels, an associated number of symbols, an associated power level, and by repetition coding. The DL map 20 may include a guard time 32 referred to as a cyclic prefix (CP) and data 34. The guard time 32 is a copy of bits from the end of a symbol that are inserted before the start of the symbol. The guard time 32 is used to eliminate inter-symbol interference introduced by multi-path components. The UL map 22 provides sub-channel allocation for a next or subsequent frame.

The UL subframe 14 includes the UL bursts 30 (UL bursts$_{1-n}$ are shown) a bandwidth request (BWR) subchannel portion 34, and a ranging subchannel portion 36. The BWR subchannel portion 34 may be used to request bandwidth from the BS. The MS may have an allocated bandwidth relative to a total available bandwidth for stations in a network. The ranging subchannel portion 36 is used to join the MS to the network of the BS and to acquire transmission parameters, such as a timing offset and a transmit power level. The ranging subchannel portion 36 allows the MS to adjust transmission parameters and maintain uplink communication with the BS.

Figure 2:
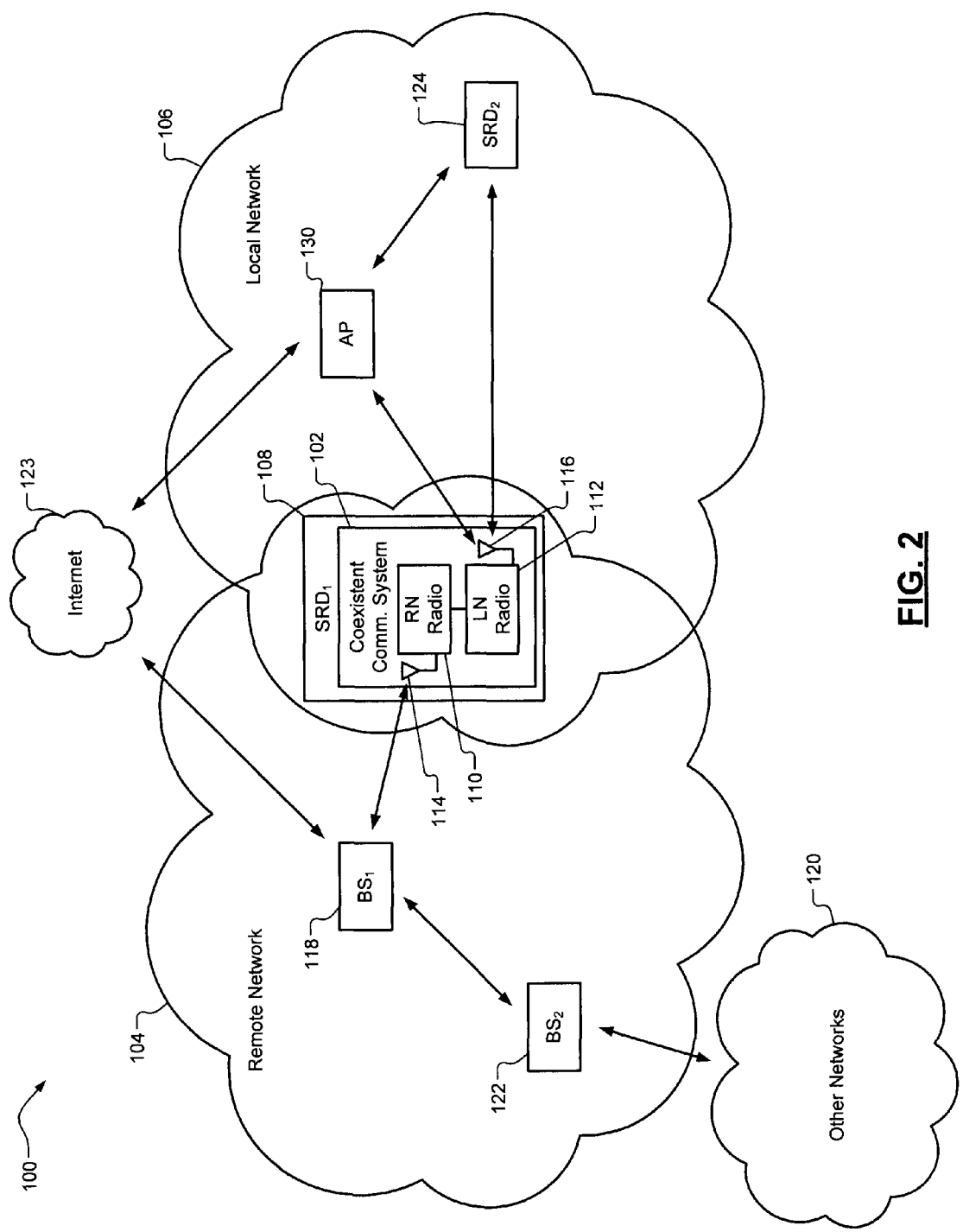
FIG. 2 is a functional block diagram of a network system incorporating a coexistent communication system in accordance with an embodiment of the present disclosure.

Referring now to FIG. 2, a network system 100 with one or more coexistent communication systems 102 is shown. The network system 100 includes one or more remote network(s) 104 and one or more local network(s) 106. A first $SRD_1$ 108 is shown that includes the coexistent communication system 102. The coexistent communication system 102 includes a remote network (RN) radio 110 and a local network (LN) radio 112 that allow the first $SRD_1$ 108 to communicate respectively with the remote and local networks 104, 106. The RN and LN radios 110, 112 have respective antennas 114, 116.

The RN radio 110 may access the remote network 104 and communicate with a first $BS_1$ 118 via a first communication link. The first $BS_1$ 118 may be in communication with one or more other networks 120. The first $BS_1$ 118 may communicate with the other networks 120 directly or via another base station $BS_2$ 122. The first $BS_1$ 118 may communicate with an Internet 123.

The LN radio 112 may access the local network 106 and communicate with network devices, such as other SRDs (a second $SRD_2$ 124 is shown), in the local network 106. The LN radio 112 may communicate with the other SRDs using another communication link. Each of the SRDs may include a coexistent communication system. The LN radio 112 may operate in indirect or direct modes. When in the indirect (infrastructure) mode, the LN radio 112 may communicate with other SRD(s) (peer devices) or the Internet 123 via an access point (hotspot) 130. The LN radio 112 communicates with the access point using a corresponding communication link. The access point 124 may include a hub, a router, and/or a modem that is connected to a wired network, which in turn may be connected to the Internet 123. When in the direct (ad-hoc) mode the LN radio 112 may directly communicate with the other SRD(s), such as the second $SRD_2$ 124.

The RN radio 110, as well as the RN radios of the other network devices of the network system 100, may be based on one or more wireless cellular broadband communication (WCBC) technologies, protocols and standards. Example WCBC technologies standards are the worldwide interoperability for microwave access (WiMAX) technology (IEEE 802.16 standard), 3rd generation partnership project (3GPP) technologies and standards, and/or long term evolution (LTE) technologies and standards. The WCBC standards are incorporated herein by reference in their entirety. The LN radio 112, as well as the LN radios of the other network devices of the network system 100, may be based on one or more IEEE 802.11 and 802.15 technologies, protocols and standards. Example IEEE 802.11 and 802.15 technologies are technologies associated with a wireless local area network (WLAN), a personal area network (PAN), a Bluetooth network, a Wi-Fi network, a medium access control (MAC) layer/physical (PHY) layer (AMP) network, a request-to-send (RTS)/clear-to-send (CTS) network, etc. The LN radios may operate based on IEEE 802.11 and 802.15 standards including 802.11a, 802.11b, 802.11g, 802.11n, 802.15.1, 802.15.2, etc, which are incorporated herein by reference in their entirety.

The RN radio 110 may be used for long range communication to remote network devices. The LN radio 112 may be used for short range communication to local network devices. As an example, the RN radio 110 may be associated with communication distances of greater than approximately 200 feet (ft) or 70 meters. The LN radio 112 may be associated with communication distances of less than or equal to approximately 200 ft or 70 meters. The RN radio 110 may be used for communication between two LN radios.

The RN and LN radios 110, 112 have associated and/or dedicated power transmission levels and/or ranges and communication channels (frequencies) and/or bands. For example, transmission power of the RN radio 110, when communicating in a WiMAX network, may be approximately 200-631 mW (milli-watt) (regulatory) or 23-28 dBm (decibels relative to 1 mW). Transmission power of the LN radio 112, when communicating in a Bluetooth 802.11 AMP or Wi-Fi network, may be limited to approximately 63-100 mW (regulatory) or 18-20 dBm. As an example, the RN radio 110 may have a transmission power level of greater than 150 mW and the LN radio 112 may have a transmission power level of less than or equal to 150 mW. Path loss between the RN radio 110 and the LN radio 112 may be, for example, 15 dB (decibels relative to voltage, current or power).

The communication bands of the RN and LN radios 110, 112 may be adjacent to each other and/or share one or more channels. The term adjacent may refer to bands that are in succession. Interference can arise between overlapping bands, as well as between adjacent bands. For example, the RN radio 110 may have an associated Federal Communication Commission (FCC) band plan and the LN radio 112 may operate in an industrial, scientific and medical (ISM) band. The FCC band plan may allow the RN radio to operate, for example, in a 2.4-2.7 MHz (mega-hertz) band and a 2.3-2.4 GHz (giga-hertz) band. The ISM band may be, for example, approximately 2.4-2.5 GHz.

The RN and LN radios 110, 112 may not have overlapping bands or as in the following example the RN and LN radios 110, 112 may have overlapping bands. For example, when the RN radio 110 operates in the 2.3-2.4 GHz band, the RN radio 110 and the LN radio 112 may share a 2.4 GHz channel. The RN and LN radios 110, 112 may have corresponding channels other than the 2.4 GHz channel that are within approximately 100 MHz of each other. Example channel bandwidths for the RN radio 110 are 10 MHZ, 8.75 MHz, 7 MHz, 5 MHz, and 3.5 MHz. Example channel bandwidths for the LN radio 112 are 20 MHz, 10 MHz, and 5 MHz.

Since the RN and LN radios 110, 112 may operate in or near the same communication bands, saturation may occur at receivers of the RN radio 110 or at the LN radio 112. Saturation may refer to the reception of signals by a first radio that are transmitted by another radio that is coexistent with the first radio. The signals received from the coexistent radio prevent accurate reception by the first radio of signals transmitted from a remote network device. The saturation may be due to the use of low order filters in the radios, which have low amounts of out-of-band rejection.

The saturation can prevent one radio of the first $SRD_1$ 108 from receiving when the other collocated radio of the first $SRD_1$ 108 is transmitting. For example, the RN radio 110 may receive LN signals transmitted from the collocated LN radio 112, which may saturate the RN receiver (front end). This may prevent reception of signals transmitted by the first $BS_1$ 118. As another example, the LN radio 112 may receive RN signals transmitted from the collocated RN radio 110, which may saturate the LN receiver (front end). This may prevent reception of signals transmitted by the second $SRD_2$ 124. LN signals refer to signals transmitted between LN radios of, for example, SRDs. RN signals refer to signals transmitted between a RN radio and a BS. LN signals and RN signals respectively include LN and RN packets.

The embodiments disclosed herein provide various techniques that allow the RN and LN radios 110, 112 to coexist and/or be collocated without saturation. The embodiments include allowing the RN and LN radios 110, 112 to transmit and receive during scheduled times and/or during the same time period and/or based on coexistent interface signals, request-to-send (RTS)/clear-to-send (CTS) techniques, activity reports, and other techniques described below.

Figure 3:
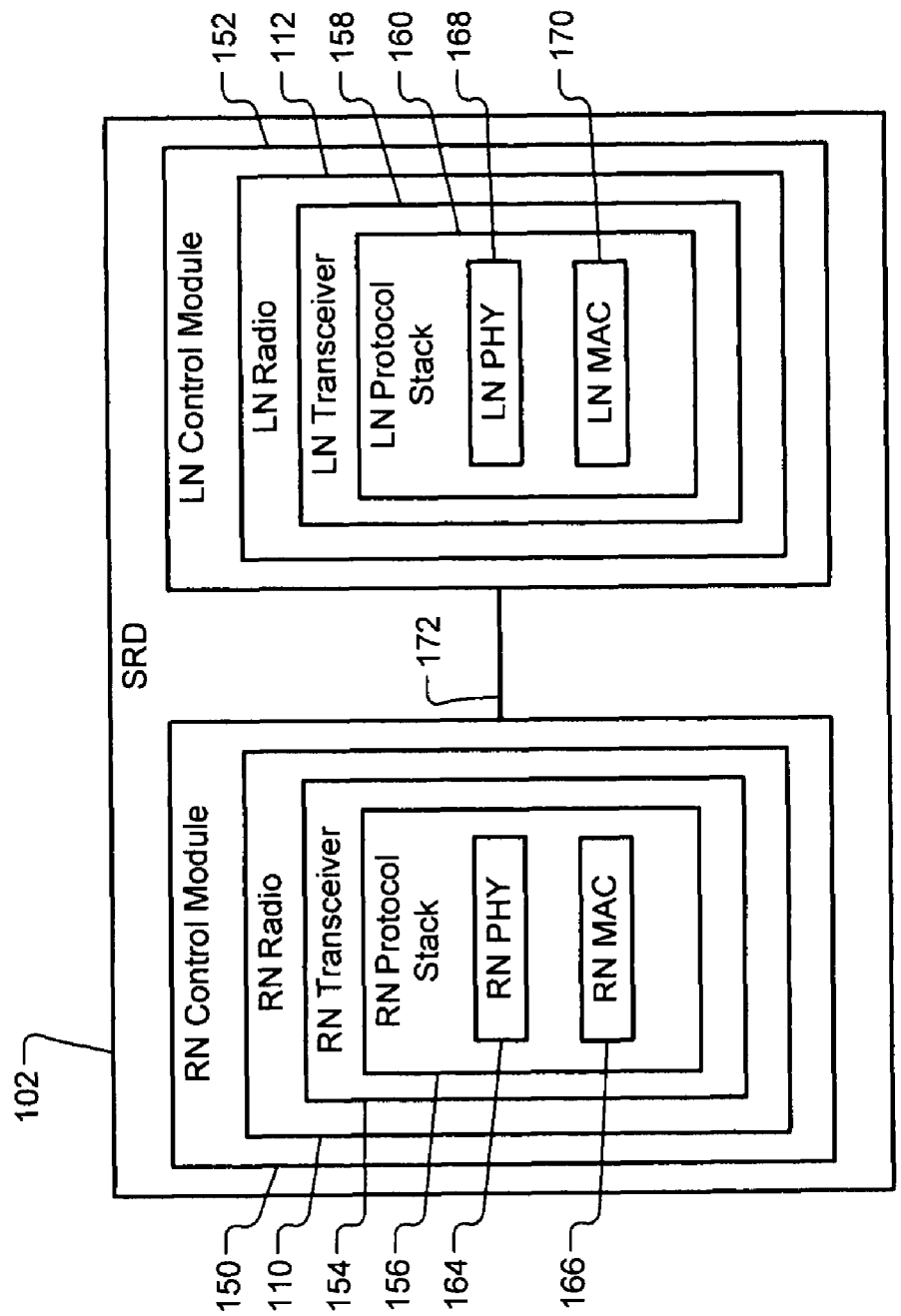
FIG. 3 is a functional block diagram of the coexistent communication system in accordance with an embodiment of the present disclosure.

Referring now also to FIG. 3, the coexistent communication system 102 is shown. The coexistent communication system 102 includes an RN control module 150 with the RN radio 110 and an LN control module 152 with the LN radio 112. The RN and LN control modules 150, 152 and the devices of the RN and LN control modules 150, 152 may be implemented separately or as part of a single integrated circuit. The RN and LN control modules 150, 152 may be implemented as a single control module and may schedule communication of the RN radio 110 and the LN radio 112 based on status of the other one of the RN radio 110 and the LN radio 112. The status may include communication timing, transmission, and/or reception of RN and/or LN signals. The RN radio 110 has an RN transceiver 154 with an RN protocol stack 156. The LN radio 112 has an LN transceiver 158 with an LN protocol stack 160. The RN protocol stack 156 includes a first PHY layer device 164 and a first MAC layer device 166. The LN protocol stack 160 includes a second PHY layer device 168 and a second MAC layer device 170.

The RN radio 110 may be in communication with the LN radio 112 via a communication interface 172. The communication interface 172 may be a wired or wireless communication interface. The communication interface 172 may be used by each of the RN and LN radios 110, 112 to determine when the other one of the RN and LN radios 110, 112 is transmitting and/or receiving respective RN and LN signals. This allows for the timing of RN and LN signals and/or the performance of other tasks to prevent interference between the RN and LN radios 110, 112.

Figure 4:
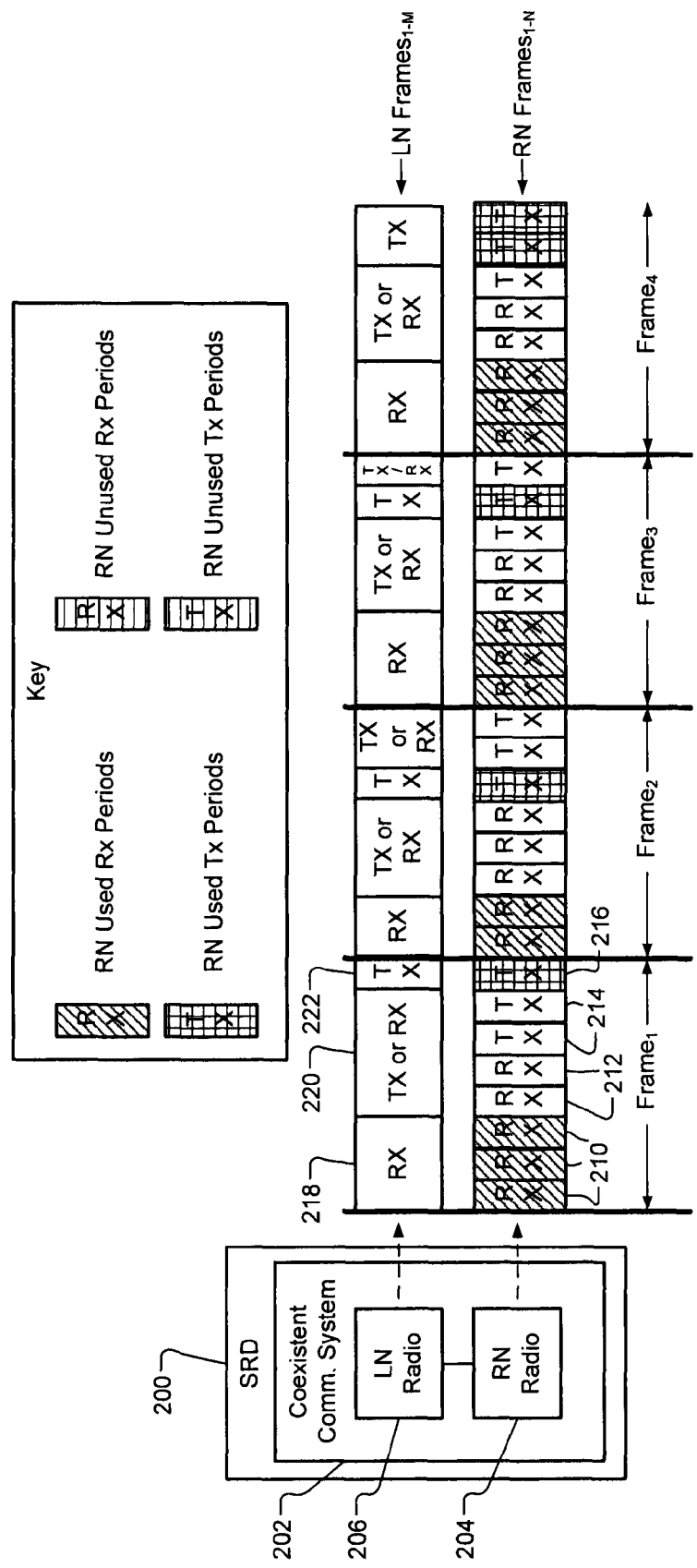
FIG. 4 is a functional block diagram of a SRD with a corresponding coexistent signal timing diagram in accordance with an embodiment of the present disclosure.

Referring now to FIG. 4, a SRD 200 with a corresponding coexistent signal timing diagram is shown. The SRD 200 includes a coexistent communication system 202 with RN and LN radios 204, 206, which are collocated. The coexistent signal timing diagram illustrates an example of transmission and reception timing for the RN and LN radios 204, 206. Exemplary RN frames$_{1-N}$ and LN frames$_{1-M}$ are shown that each may have a 5 ms (milli-second) duration, where N and M are integers.

RN allocated transmission and reception periods during each of the frames are shown. The frames may include UL and DL subframes that are received or transmitted during respective periods. Example UL and DL subframes are shown in FIG. 1. As an example during the first RN frame, three RN reception periods 210 are shown, followed by two RN non-used reception periods 212, two non-used RN transmission periods 214, and an RN allocated transmission period 216. Each of the RN reception periods may have an associated symbol. Each of the periods 210-216 is not restricted to a particular number of symbols. Although the coexistent signal timing diagram is shown primarily with respect to Bluetooth 802.11 AMP and WiMAX operations, the timing diagram may be modified for other local and remote network operations.

To prevent saturation in the RN and LN radios 204, 206, the LN radio 206 may: receive signals during the allocated (used) RN reception periods; transmit or receive during the unused RN transmission and reception periods; and transmit during the allocated RN transmission period. As an example, the first LN frame includes an LN transmission period 218, a LN transmission and reception period 220, and a LN reception period 222. The LN frames may be different in length than the RN frames, but the LN transmission and reception periods may be based on the RN transmission and reception periods.

When the RN and LN radios 204, 206 are using the same channel or channels within a predetermined frequency range of each other, the RN and LN radios 204, 206 may transmit during the same periods and receive during the same periods. The RN radio 204 may not be permitted to transmit when the LN radio 206 is receiving. The LN radio 206 may not be permitted to transmit when the RN radio 204 is receiving. This prevents interference between the LN and RN radios 204, 206.

The durations for transmission and reception by the RN and LN radios 204, 206 is provided for example purposes only. The durations may vary per application and/or based on frame size, transmission and reception speeds, timing schedules, etc. Although a particular number of used and non-used transmission and reception periods are shown, any number of used and non-used transmission and reception periods may be associated with a RN frame.

The first subframe of a DL is associated with RN radio reception and includes preamble, MAP and payload symbols, as shown in FIG. 1. The first few symbols of a RN signal or frame may include preamble and MAP symbols and have an associated duration of approximately 300-700 μs. The LN radio 206 does not transmit packets, such as 802.11 packets, during the DL period when the preamble, MAP and payload symbols are received.

During a UL transmission the RN radio 204 may transmit data to a BS. During the UL transmission, the LN radio 204 does not receive LN associated packets, such as 802.11 packets. The SRD 200 may notify a peer device of the SRD 200 to not transmit packets to the SRD 200.

Figure 5:
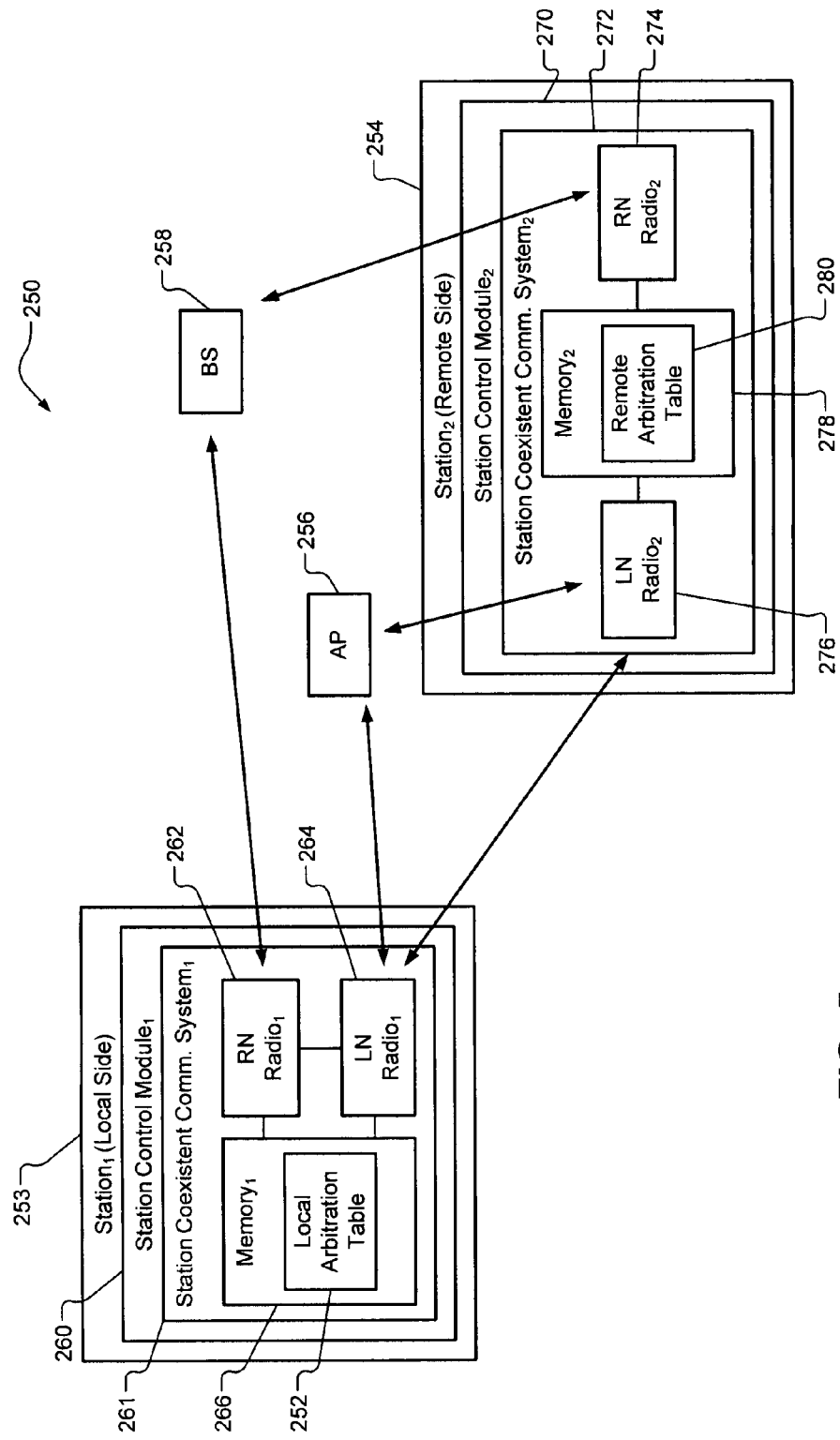
FIG. 5 is a functional block diagram of a network system incorporating multiple coexistent communication systems in accordance with an embodiment of the present disclosure.

Referring now to FIGS. 5 and 6, a network system 250 and a first (local) arbitration table 252 are shown. The network system 250 includes a first station 253 (local multi-radio station) that may be in communication with a second station 254 (remote multi-radio station) via an AP 256. The first station 253 and the second station 254 may be in communication with a BS 258.

For example only, the first station 253 may be a SRD and the second station 254 may be an SRD or AP. The first arbitration table 252 may be used by the first station 253 for coexistence and/or collocation of RN and LN radios when a communication interface is provided between the RN and LN radios. The first arbitration table 252 defines an arbitration rule based on information of RN and LN radio activity at the first station 253. The arbitration rule may indicate precedent between the RN and LN radios when the RN and LN radios of the first station 253 transmit and/or receive.

The first station 253 includes a first station control module 260 with a first coexistent communication system 261. The first coexistent communication system 261 includes a first RN radio 262, a first LN radio 264 and a first memory 266 with the first arbitration table 252. The second station 254 includes a second station control module 270 with a second coexistent communication system 272. The second coexistent communication system 272 includes a second RN radio 274, a second LN radio 276 and a second memory 278 with a second (remote) arbitration table 280.

According to the first arbitration table 252, the first RN and LN radios 262, 264 may transmit during the same periods or receive during the same periods. When the RN radio 262 is transmitting, the LN radio 264 is not permitted to receive. When the RN radio 262 is receiving the LN radio 264 is not permitted to transmit. In this example embodiment, the RN radio 262 is provided with priority over the LN radio 264. The LN radio 264 may be provided with priority over the RN radio 262. For example, when the LN radio 264 is transmitting the RN radio 262 is not permitted to receive or when the LN radio 264 is receiving the RN radio 262 is not permitted to transmit.

The precedent between the RN and LN radios 262, 264 may be based on quality of service (QoS) values associated with the services of the RN and LN radios 262, 264, which may be stored in the first memory 266. Packet transmission and reception may be scheduled based on QoS information associated with the RN and LN radios 262, 264. This improves multi-radio station performance.

As another example, RN transmission may have priority over LN reception when LN transmission has priority over RN reception. As yet another example, LN reception may have priority over RN transmission when RN reception has priority over LN transmission.

The coexistent communication system 261 may include more than one arbitration table. The arbitration tables may be based on RN and LN precedents. The arbitration tables may be used by the RN and LN radios 262, 264.

Referring now also to FIG. 7, the second arbitration table 280 is shown. The second arbitration table 280 may be used by the second station 254. The second arbitration table 280 defines an arbitration rule based on information of RN activity at the second station 254 and/or LN activity at the first station 253. The arbitration rule indicates when the RN and LN radios 274, 276 of the second station 254 transmit and/or receive.

According to the second arbitration table 280, the RN radio 274 of the second station 254 may transmit when the LN radio 264 of the first station 253 receives. The RN radio 274 of the second station 254 may receive when the LN radio 264 of the first station 253 transmits.

When RN transmission and/or reception has precedent, the RN radio 274 of the second station 254 may transmit when the LN radio 264 of the first station 253 transmits. The RN radio 274 of the second station 254 may receive when the LN radio 264 of the first station 264 receives. The opposite may hold true when LN transmission and/or reception has precedent.

The precedents of the second arbitration table 280 may be based on QoS values associated with the services of the RN radio 274 of the second station 254 and the LN radio 264 of the first station 253. Packet transmission and reception may be scheduled based on QoS information associated with the RN radio 274 of the second station 254 and the LN radio 264 of the first station 253. This improves multi-radio station performance.

As another example, RN transmission of the RN radio 274 may have priority over LN transmission of the LN radio 264 when LN reception of the LN radio 264 has priority over RN reception of the RN radio 274. As yet another example, LN transmission of the LN radio 264 may have priority over RN transmission of the RN radio 274 when RN reception of the RN radio 274 has priority over LN reception of the LN radio 264.

The coexistent communication system 272 may include more than one arbitration table. The arbitration tables may be based on RN and LN precedents. The arbitration tables may be used by the RN and LN radios 274, 276.

Figure 8:
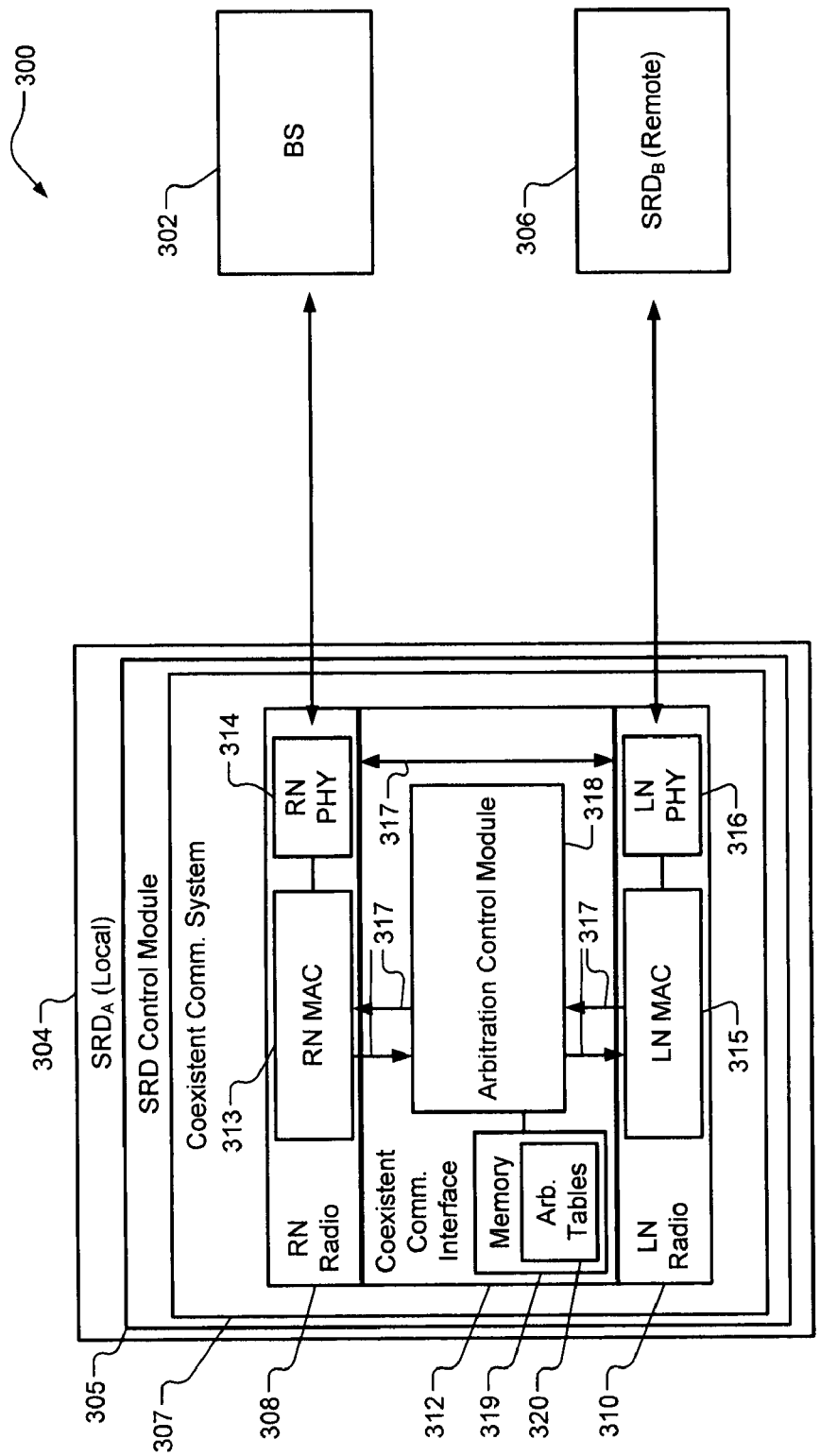
FIG. 8 is a functional block diagram of a network system incorporating an SRD with a coexistent communication interface in accordance with an embodiment of the present disclosure.

Referring now to FIG. 8, a network system 300 that includes a BS 302 and first (local) and second (remote) SRDs 304, 306 is shown. The local SRD 304 is in communication with the remote SRD 306. The local SRD 304 includes a first coexistent communication system 307 with a first SRD control module 305 that has a first (local) RN radio 308 and a first (local) LN radio 310. The first RN radio 308 may communicate with the first LN radio 310 via a first (local) coexistent interface 312. The first RN radio 308 includes a RN MAC device 313 and a RN PHY device 314. The first LN radio 310 includes a LN MAC device 315 and a LN PHY device 316. Although not shown, the remote SRD station 306 may include a second (remote) coexistent communication system with a second (remote) RN radio, a second (remote) LN radio and a second (remote) coexistent interface, similar to that of the first SRD 304.

The first coexistent interface 312 is a collaborative interface in which the first RN radio 308 and the first LN radio 310 exchange information. The first coexistent interface 312 includes coexistent lines 317, an arbitration control module (ACM) 318 and memory 319. The first control module 305 and/or the ACM 318 may schedule communication of the RN and LN radios 308, 310 based on the status of the other one of the RN and LN radios 308, 310. This status may include communication timing, transmission, and/or reception of the RN radio 308 and/or the LN radio 310.

Although a certain number of coexistent lines are shown, any number of coexistent lines may be incorporated. The coexistent lines 314 may transport signals between the RN radio 308 and the ACM 318, between the LN radio 310 and the ACM 318, and/or directly between the RN and LN radios 308, 310. The transported signals may be similar to IEEE 802.15.2 signals. IEEE standards 802.11, 802.15 including 802.15.1 and 802.15.2, and 802.16 are incorporated herein by reference in their entirety.

The transported signals may include transmit, receive and abort signals. The transmit and receive signals may indicate to a respective one of the RN and LN radios 308, 310 when the other one of the RN and LN radios 308, 310 is to transmit and/or receive RN or LN data. The abort signals may be received by the RN and LN radios 308, 310 indicating that a current process or operating mode should cease to be performed. Priority signals may also be transmitted between the RN and LN radios 308, 310 indicating, for example, which radio has priority or precedent for a particular period.

The coexistent lines 317 may be physical hardware signal transporting lines, or may be hardware and/or software based application program interfaces (APIs). When the coexistent lines 317 are in the form of APIs, additional signals may also be transmitted between the RN and LN radios 308, 310. For example, transmission duration signals, reception duration signals, next transmit signals, next receive signals, UL/DL ratio signals, and frame duration signals may be transmitted. The transmission and reception duration signals may indicate duration of RN and LN signals being transmitted from and received by the RN and LN radios 308, 310. The next transmit and receive signals may indicate time until a next RN or LN signal is transmitted from or received by the RN and LN radios 308, 310. The UL/DL ratio signals may indicate the ratio in time between UL and DL signals transmitted between the RN radio 308 and a BS 302. The frame duration signals may indicate the duration of the RN and LN signals transmitted from and/or received by the RN and LN radios 308, 310.

The ACM 318 may schedule communication of RN and LN signals of the RN and LN radios 308, 310 based on any of the above additional signals.

The ACM 318 and the memory 319 may be included as part of the coexistent interface 312 or may be included as part of the first RN radio 308 or the first LN radio 310. The ACM 318 may transmit and receive request, confirmation, and/or status signals from the first RN and LN radios 308, 310. The request, confirmation, and/or status signals may indicate when the first RN and LN radios 308, 310 are transmitting and/or receiving packets to and from the BS 302, the second SRD 306, or other stations within the network system 300, such as an AP.

The ACM 318 may signal the first RN radio 308 the status of the first LN radio 310 and/or may signal the LN radio 310 status of the first RN radio 308 based on the request, confirmation, and/or status signals. The ACM 318 may control when the first RN radio 308 and/or the first LN radio 310 transmit and/or receive packets. This control may be based on the RN and/or LN signals received from the first RN radio 308 and/or the first LN radio 310. The ACM 318 may provide transmit and/or receive permission signals to the first RN and LN radios 308, 310. The permission signals may be based on the transmit and/or receive request signals and/or based on the transmission and/or reception status of the first RN and LN radios 308, 310. The ACM 318 provides this control based on one or more of the arbitration tables 320, which may include the arbitration tables 252, 280 of FIGS. 6 and 7. The ACM 318 when allocating time for transmission and reception may alternate between the RN radio 308 and the LN radio 310.

In one embodiment, RN authority or permission signals are sent to the ACM 318 and/or to the LN radio 310 from the RN radio 308. The RN permission signals indicate when the RN radio 308 is to transmit and/or receive packets to and from the BS 302. LN authority or permission signals may also be sent to the ACM 318 and/or to the RN radio 308 from the LN radio 310. The LN permission signals indicate when the LN radio 310 is to transmit and/or receive packets to and from the second SRD 306 or an AP. The RN and LN permission signals may be sent via the coexistent lines 314 and/or the coexistent interface 312.

Coexistence and/or collocation of RN and LN radios 308, 310 may be primarily handled locally via the first SRD 304, as described above or may be handled through communication between, for example, the first and second SRDs 304, 306. Various coexistence techniques are described below that include communication between local and remote multi-radio stations.

RTS/CTS

Figure 9:
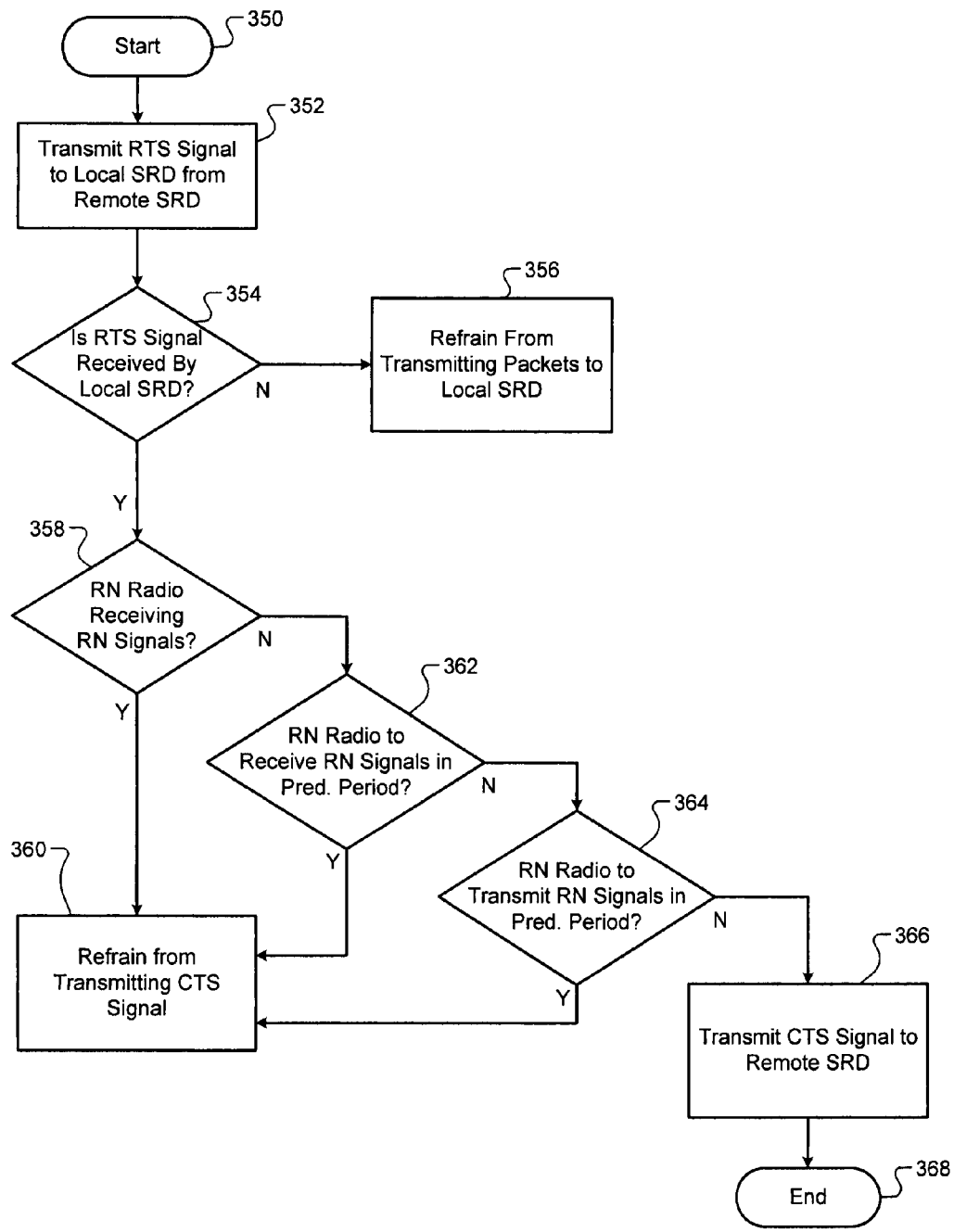
FIG. 9 illustrates a method of preventing interference in a coexistent communication system in accordance with an embodiment of the present disclosure.

Coexistence and/or collocation of RN and LN radios may be supported through the use of request-to-send (RTS) and clear-to-send (CTS) signals. Referring now also to FIG. 9, a method of preventing interference in a coexistent communication system, such as the coexistent communication system 307, is shown. More specifically, FIG. 9 illustrates a RTS/CTS method of operating local and remote SRDs, such as the first and second SRDs 304, 306, to support coexistence and/or collocation of RN and LN radios. The method may begin at step 350.

In step 352, the remote SRD transmits a RTS signal to the local SRD. The RTS signal may be transmitted via LN radio(s) of the remote SRD, such as via Bluetooth 802.11 AMP radio(s). In step 354, when the local SRD does not receive the RTS signal step 356 is performed, otherwise step 358 is performed.

In step 356, the remote SRD refrains from transmitting packets to the local SRD. Since the local SRD did not receive the RTS signal, the local SRD does not respond with a CTS signal. Non-reception of a CTS signal indicates to the remote SRD that the RN radio of the local SRD may be active and that the LN radio of the local SRD is not able to receive packets from the remote SRD.

In step 358, the LN radio of the local SRD determines if the RN radio of the local SRD is receiving RN signals including RN packets, such as WiMAX signals. When the RN radio of the local SRD is transmitting RN data, the LN radio of the local SRD may not have received the RTS signal. When the RN radio of the local SRD is receiving RN data, the LN radio of the local SRD may receive the RTS signal. The LN radio on the local SRD may sense coexistent line(s) or may receive a signal from a coexistent interface that indicates when the LN signals are to be received.

After receiving the RTS signal, the local SRD may determine the transmit and/or receive status of the RN radio. The local SRD may permit transmission of LN packets from the remote SRD based on the transmit and/or receive status of the RN radio and/or the precedents between the RN radio and the LN radio. When the RN radio is receiving RN packets, control proceeds to step 360, otherwise control proceeds to step 362.

In step 360, the LN radio of the local SRD does not respond to the RTS signal. The LN radio refrains from transmitting a CTS signal to the remote SRD. This indicates to the remote SRD that the local SRD is not available. In step 362, the LN radio of the local SRD determines whether the RN radio is to receive RN signals including RN packets, such as WiMAX packets, in a predetermined period. When the RN radio is to receive RN packets in the predetermined period then step 360 may be performed, otherwise step 364 is performed.

In step 364, the LN radio of the local SRD determines whether the RN radio is to transmit RN signals including RN packets, such as WiMAX packets, in a predetermined period. When the RN radio is to transmit RN packets, such as WiMAX packets, in a predetermined period then step 360 may be performed, otherwise step 366 is performed.

Step 362 and/or step 364 may be omitted from the described method. When step 362 is omitted, step 364 or step 366 may be performed when the RN radio is receiving RN signals. When step 364 is omitted, step 366 may be performed when the RN radio is to receive RN signals in a predetermined period.

In step 366, the local SRD transmits a CTS signal to the remote SRD in response to the RTS signal. The CTS signal may be generated based on information in the RTS signal. In one embodiment, the local SRD sends the CTS signal when the RN radio is not receiving RN packets. The method may end at step 368.

With respect to steps 362 and 364, the LN radio may determine when the RN radio is to transmit or receive packets within a predetermined period. The LN radio may: 1) sense received signals of the RN radio; 2) sense transmit signals of the RN radio; and/or 3) receive an explicit indication signal from the RN radio. When sensing received or transmitted signals of the RN radio, the LN radio may determine if the received or transmitted signals are periodic. When the signals are periodic, the LN radio may determine the period of the received or transmitted signals and thereby determine when a next signal is to be received or transmitted by the RN radio. The LN radio may, for example, receive the explicit indication signal during a next transmit or receive interval when the RN radio is not transmitting or receiving signals to and from a BS.

The LN radio may transmit a CTS signal based on relative priority between RN signal reception of the RN radio and LN traffic flow of the LN radio. When the RN radio has precedent, a CTS signal may not be sent. When the LN radio has precedent, the CTS signal may be sent.

The LN radio may receive priority indication signals indicating priority of RN signals from hardware (HW) or software (SW) associated with the local SRD. The HW and/or SW may be part of the RN radio, the LN radio, an interface between the RN and LN radios, or part of another module of the local SRD.

The LN radio may determine priority of a next LN signal to be transmitted based on a QoS traffic priority value indicated by LN packets generated, such as generated 802.11 packets, or by out of band signaling. Out of band signaling may refer to the transmission or reception of signals in a frequency range that is different than the frequency range associated with the LN signals.

In another embodiment, the LN radio transmits the CTS signal based on relative priority between RN and LN data. When LN data has priority, LN transmission may be permitted and the local SRD may send an indication via HW or SW to the RN radio to abort reception of RN data by the RN radio. When RN data has priority, LN transmission may not be permitted and the RN radio may be permitted to continue receiving RN data.

Interference/Activity Reporting

Coexistence and/or collocation of RN and LN radios may be supported through the use of an interference (activity) report that indicates to a remote station that interference is present. The interference may be associated with active RN radio transmission and/or reception of a local SRD. The interference report may indicate that RN radio transmission and/or reception is active. The interference reporting allows the transmission of a known schedule of collocated interference to a remote SRD. A remote SRD may provide an interference schedule to a local SRD. Each of the local and remote SRDs may adjust communication schedules for respective LN and RN radios based on the interference report of the other SRD. The interference report may be provided via the LN radio of the local SRD.

The interference report may include an interference start time, a duration of interference, a period of interference, and an interference end time. The interference start time may indicate when the RN radio of the local SRD is to begin transmitting and/or receiving RN data. The duration of interference may refer to a length of time in which RN data is to be transmitted and/or received. A period of interference may refer to a length of a period of a periodically and/or iteratively performed task. For example, a RN radio may receive RN data for 0.5 ms every 5 ms, where the 0.5 ms may be the duration of interference for a particular period and the 5 ms may be the period of interference.

As an example, an interference report may indicate when a RN radio is expected to receive DL and UL maps. The RN radio may receive DL and UL maps periodically or during the period of each frame. The sending of an interference report to a remote SRD indicates to the remote SRD not to send LN data. This prevents interference with reception of the DL and UL maps. Loss of map data could lead to the local SRD disconnecting from the network and/or communication with the BS.

As another example, the interference report may indicate when a RN radio is in an active mode as opposed to a sleep mode. The RN radio may negotiate a low power mode (sleep or idle mode) with the BS. During the low power mode, the RN radio may wake up every T seconds and for a predetermined duration to listen to paging. Paging refers to the transmission of signals, for example, from the BS to the RN radio indicating that the BS has packets to transmit to the RN radio. The wake up events are periodic. The LN radio may be prevented from transmitting during times when the RN radio is listening for paging signals.

RN radio activity may be determined by the LN radio using various techniques. The RN radio activity may be reported to the remote SRD using an interference report. As a first example, API signals may be received from the RN radio by the LN radio indicating activity periods with reference to a clock signal. The activity periods may be reported to the remote SRD. The clock signal may be accessible by both the RN radio and the LN radio. As a second example, the LN radio may sense or receive signals via coexistent lines and determine periodicity of reception of RN data by the RN radio. The periodicity information may be provided to the remote SRD. As a third example, external hardware signals may be received by the LN radio indicating when the RN radio is receiving a DL or UL map or is receiving a paging signal. The external hardware signals may be received from the RN radio or from another module of the local SRD. The external hardware signals may be received via the coexistent line(s) and/or a coexistent interface. The external hardware signals may be received directly or indirectly from the BS.

Figure 10:
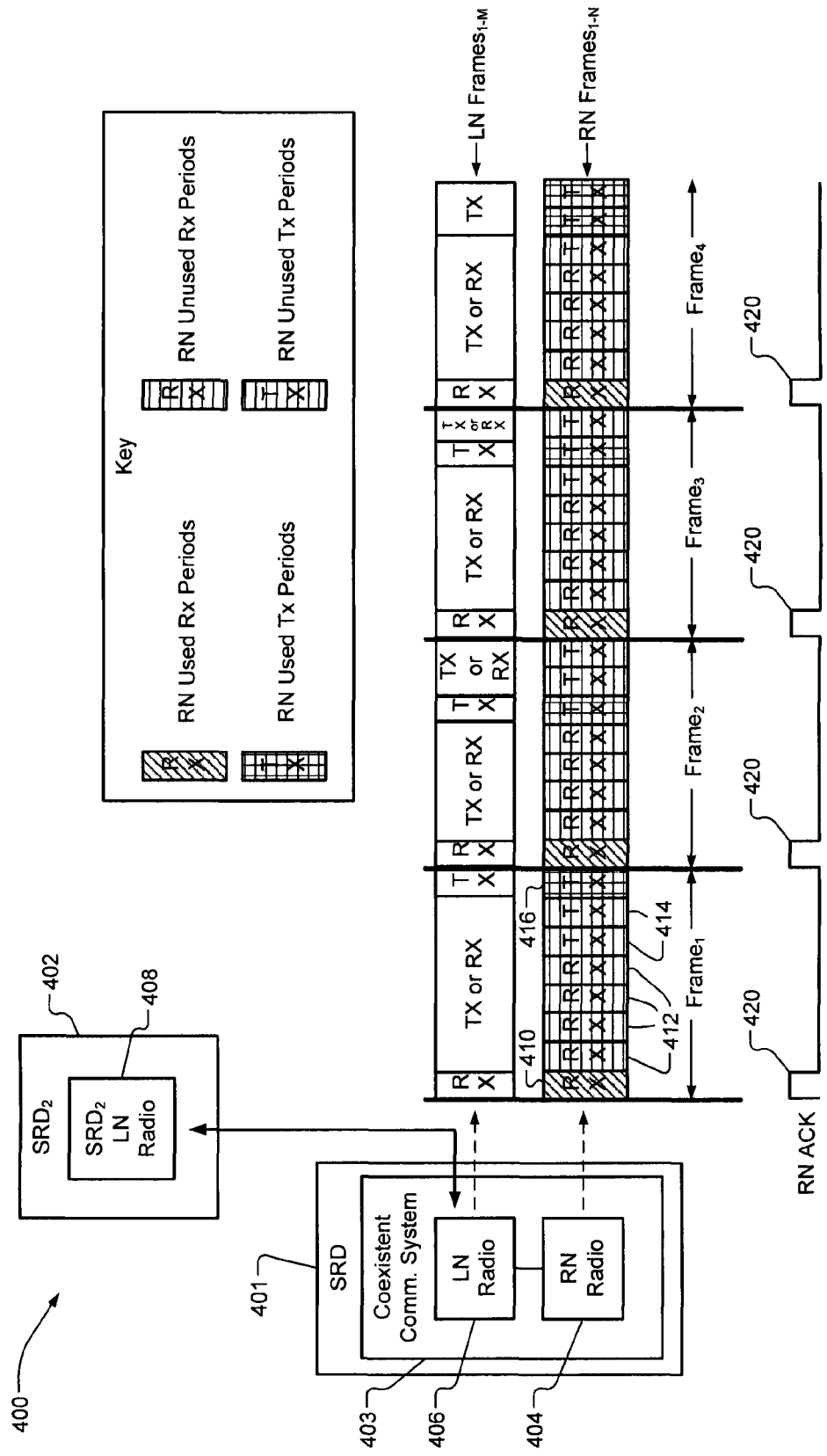
FIG. 10 is a functional block diagram of a network system with a corresponding coexistent signal timing diagram in accordance with another embodiment of the present disclosure.

Referring now to FIG. 10, a network system 400 is shown with a corresponding coexistent signal timing diagram illustrating RN radio reception times. The network system 400 includes a first (local) SRD 401 and a second (remote) SRD 402. The first SRD 401 includes a coexistent communication system 403 with a RN radio 404 and a LN radio 406. The second SRD 402 includes a second LN radio 408.

FIG. 10 is shown in association with interference reporting. The signal timing diagram illustrates an example of transmission and reception timing for collocated RN and LN radios 404, 406. Exemplary RN frames$_{1-N}$ and LN frames$_{1-M}$ are shown that each have a 5 ms duration, where N and M are integers. N may be equal to M. RN allocated transmission and reception periods during each of the frames are shown. The RN frames may include UL and DL subframes that are received or transmitted during respective periods. Example UL and DL subframes are shown in FIG. 1. As an example during the first frame, a RN and LN reception period 410 is shown, followed by four non-used reception periods 412, two non-used transmission periods 414, and an allocated RN and LN transmission period 416. Each of the RN reception periods may have an associated symbol. Each of the periods 410-416 is not restricted to a particular number of symbols. The timing of the used RN transmission periods may vary per frame, as shown.

RN and LN radio reception time may be based on DL subframe data, such as preamble symbols and DL and UL maps, and may also be based on RN acknowledgement (ACK) signals. The RN radio 404 may transmit or receive RN ACK signals in response to received and transmitted RN signals. To prevent interference between transmission and reception of the RN and LN radios: 1) the RN radio 404 may adjust when the RN ACK signals are transmitted and/or received and/or 2) the LN radio 406 and/or the LN radio 408 may account for when RN ACK signals are transmitted and received.

For example, the RN radio may shift in time when ACK signals are received such that the ACK signals are received during periods when the LN radio 406 is receiving LN signals from the LN radio 408. An example RN ACK signal is shown.

The RN ACK signal includes reception periods 420 that occur during the RN and LN reception periods.

As another example, the LN radio 408 may adjust when LN packets are transmitted based on timing of the RN ACK signals. This assures that LN signals transmitted by the LN radio 408 are received by the LN radio 406. The LN radio 408 may adjust transmission timing based on an interference schedule received from the LN radio 406.

The LN radio 406 may be prevented from receiving LN packets when the RN radio 404 is transmitting the ACK signals. The timing of LN packet reception may be adjusted to prevent overlap in times associated with the reception of LN packets and the transmission of the ACK signals.

The LN radio 406 may transmit and/or receive interference reports and/or schedules during the LN radio transmit and receive permitted periods. Interference reporting allows the transmission of a known schedule to a remote SRD, such as the second SRD 402. The schedules may include local interference or transmission and/or reception times of RN packets. For example, the transmission of a schedule of the ACK signals to a remote SRD prevents the remote SRD from transmitting LN signals during periods associated with the ACK signals. This protects the ACK signals and the reception of the DL and UL maps.

Radio Channels

Coexistence and/or collocation of RN and LN radios may be supported through the use of appropriate 802.11 AMP channels. The ISM band has 14 channels. The highest channel (channel 14) in the ISM band is 16 MHz away from the lowest WiMAX channel in the 2.5 GHz band. Channel 14 has an associated frequency of 2.484 GHz. The lowest WiMAX channel has an associated frequency of 2.5 GHz.

In the U.S., a LN radio may operate in the 2.4 GHz ISM band with associated radio channels of, for example, 6-11. Each of the channels 6-11 has associated frequencies between 2.4-2.5 GHz. Referring again to FIG. 8, in one embodiment, the LN radio 310 may adjust a channel of transmission and/or reception based on the channel used by the RN radio 308. The LN radio 308 may signal the second SRD 306 that an adjustment in the communication channel is to be performed. This maintains communication between the SRDs 304 and 306 without, for example, LN signal scheduling or activity reporting. By adjusting the communication channel, the LN radio can reduce interference with the RN radio. The LN radio 310 may receive LN signals when the RN radio 308 is transmitting and the RN radio 308 may receive RN signals when the LN radio 310 is transmitting.

Channel information may be stored in the memory 312 in addition to or as an alternative to the arbitration tables 320 or in memory of the RN and LN radios 308, 310. The coexistent communication interface may be used to communicate channel information between the RN and LN radios 308, 310.

Figure 11:
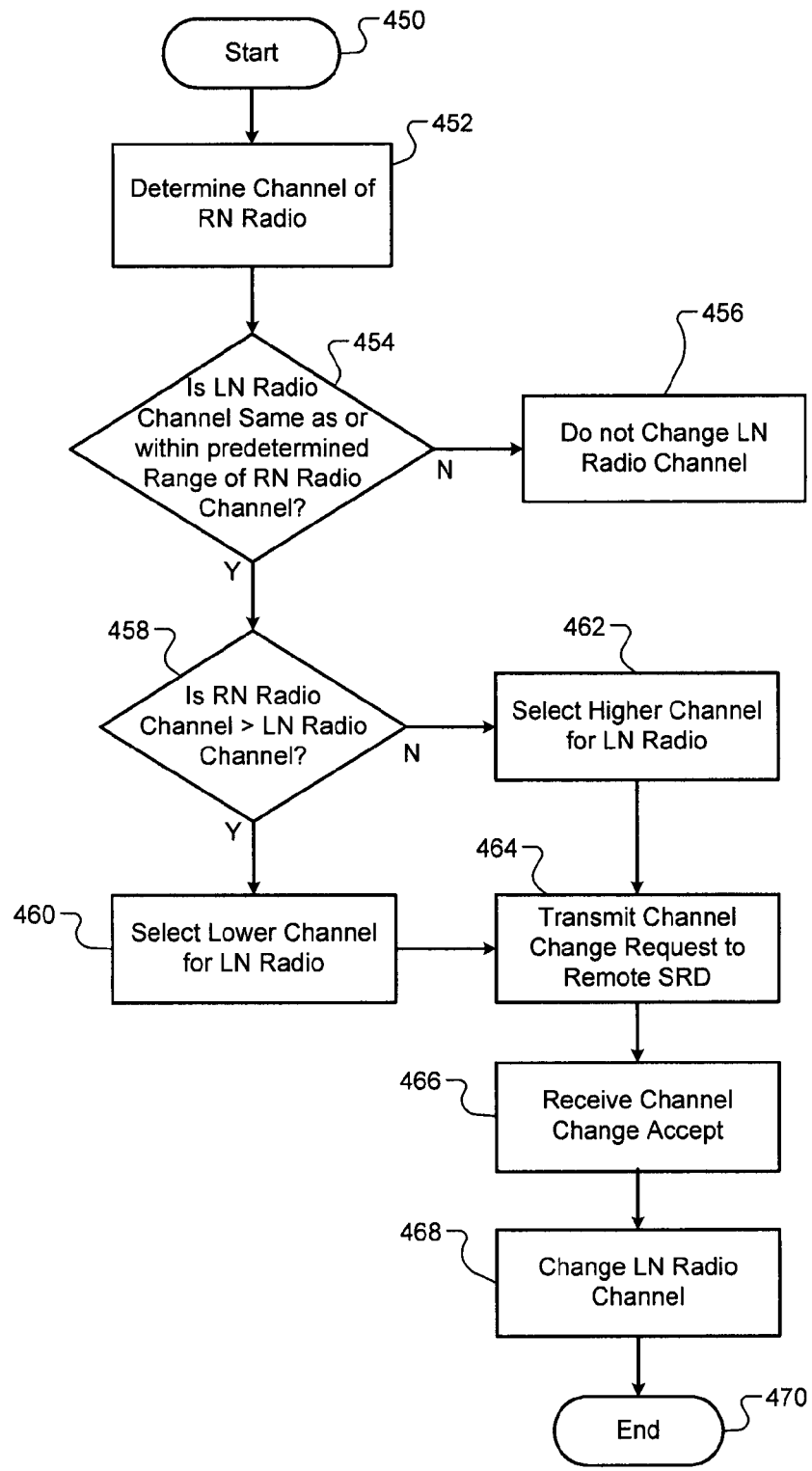
FIG. 11 illustrates a method of preventing interference in a coexistent communication system in accordance with an embodiment of the present disclosure.

Referring now to FIG. 11, a method of preventing interference in a coexistent communication system, such as the coexistent communication system 300, is shown. The method includes the altering of a channel of an LN radio, such as the LN radio 310, and may begin at step 450. Although the method is described with respect to the changing of an LN channel, the method may be modified to adjust an RN channel of an RN radio based on an LN channel.

In step 452, the LN radio may determine the operating channel of the RN radio. The LN radio may have stored information identifying the channel used by the RN radio, may receive a channel signal from the RN radio and/or a coexistent interface, or may determine the channel that the RN radio is using for RN signal communication. The LN radio may detect presence of RN transmission and/or reception, may determine the RN channel based on the detection, and may adjust to a different channel based on that detection in the following steps.

In step 454, the LN radio compares the RN radio channel to the channel of the LN radio. When the LN radio channel is not the same as or is not within a predetermined range of the RN radio channel, step 456 is performed, otherwise step 458 is performed. In step 456, the LN radio does not change the LN radio channel.

In step 458, when the RN radio channel is greater than the LN radio channel step 460 is performed, otherwise step 462 is performed. In step 460, the LN radio selects a channel lower than the current LN radio channel. For example, when the LN radio is operating at 2.4 GHz and the RN radio is operating at 2.5 GHz, the LN radio may revert to a lower communication channel than 2.4 GHz, such as 2.3 GHz or other appropriate channel.

In step 462, the LN radio selects a channel that is higher than the current LN radio channel. For example, when the LN radio is operating at 2.4 GHz and the RN radio is operating at 2.3 GHz, the LN radio may revert to a higher communication channel than 2.4 GHz, such as 2.5 GHz, 5 GHz or other appropriate channel.

In step 464, the LN radio transmits a channel change request to a remote SRD. This indicates to the remote SRD that the LN radio of the local SRD is operating on a channel that may interfere with the channel of the RN radio of the local SRD. The channel change request may indicate a channel selected by the LN radio.

Before changing to a different communication channel, the LN radio may determine if a communication channel is available. When the LN radio is creating a link with a remote SRD, the LN radio may use an open channel to communicate with the remote SRD. When a link between the LN radio and the remote SRD has already been created, then the LN radio may request and/or instruct the remote SRD to change to a different communication channel. The LN radio may send a channel change request to the remote SRD. If the remote SRD accepts the change, then the LN radio and the remote SRD change to a different channel. The remote SRD may respond with a channel change accept signal. The LN radio may indicate to the remote SRD the new channel.

In step 466, the LN radio of the local SRD receives a channel change accept signal from the remote SRD. The remote SRD may accept the selected channel and transmit the accept signal or may respond with an option signal. The option signal may include a list of channels that are available for use by the remote SRD. The local SRD may change the selected channel based on the option signal. As an alternative, the local SRD may transmit an option signal to the remote SRD. The remote SRD may then select a channel based on the option signal. This selection may be reported back to the local SRD.

In step 468, the LN radio may change to the ultimately selected channel. The LN radio may provide an indication to the remote SRD when this change occurs or the remote SRD may change to a selected channel based on the channel change request or based on a response to the option signal. The method may end at step 470.

The embodiment of FIG. 11 applies to Bluetooth (BT) 802.11 AMP systems. The embodiment of FIG. 11 may be applied to Wi-Fi™ systems. For example, a SRD when connecting to a Wi-Fi network and/or when attempting to establish connectivity with an access point of a Wi-Fi network may perform a channel scan. The SRD may scan for the access point using the same service set identifier (SSID) on more than one channel. A first radio of the SRD may select a channel or change to a different channel that is more suitable or that reduces interference with communication associated with a second (coexistent) radio of the SRD.

Figure 12:
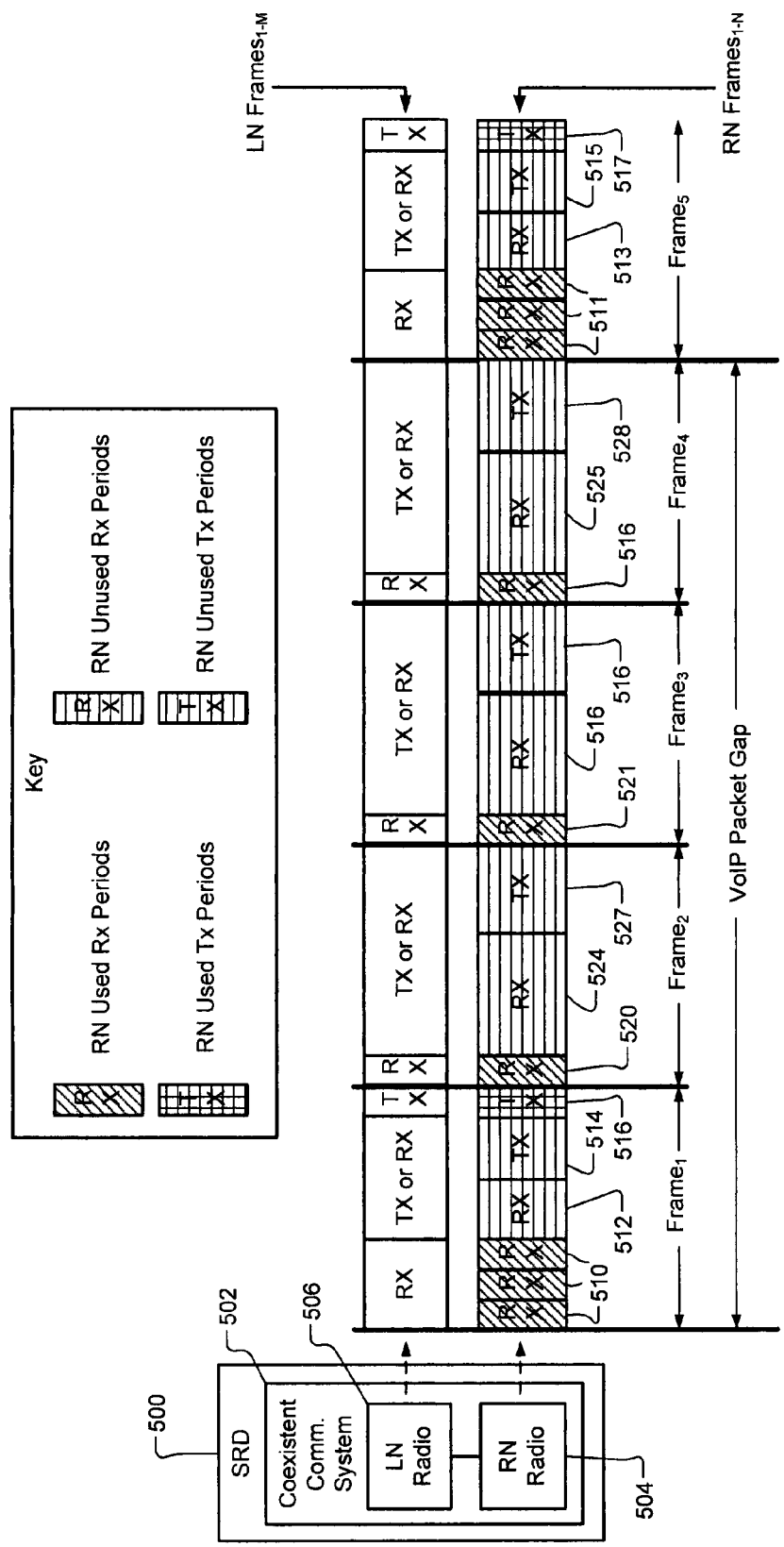
FIG. 12 a functional block diagram of a SRD with a corresponding coexistent signal timing diagram in accordance with another embodiment of the present disclosure.

Referring now to FIG. 12, a SRD 500 is shown with a corresponding signal timing diagram for RN frames and LN transmission periods. The SRD 500 includes a coexistent communication system 502 with RN and LN radios 504, 506. FIG. 12 is shown in association with interference (activity) reporting. The signal timing diagram illustrates an example of transmission and reception timing for collocated RN and LN radios. Exemplary RN frames$_{1-N}$ and LN frames$_{1-M}$ are shown that may each have a 5 ms duration, where N and M are integers that may be equal to each other. The RN frames are associated with VoIP packets. The RN frames may include UL and DL subframes that are received or transmitted during respective periods. Example UL and DL subframes are shown in FIG. 1. A VoIP inter-packet gap is shown to include four frames and may have a duration of 20 ms. A VoIP inter-packet gap may refer to time between starting times of VoIP packets and/or may refer to delay between active packets.

RN allocated transmission and reception periods during each of the frames are shown. Frames$_{1, 5}$ are active frames in which VoIP symbols are transmitted. Frames$_{2-4}$ are inactive frames in which VoIP symbols are not transmitted. As an example during the first and fifth frames, RN reception periods 510, 511 is shown, followed by a non-used reception period 512, 513, a non-used transmission period 514, 515, and an allocated RN transmission period 516, 517. During each of frames$_{2-4}$, RN reception periods 520, 521, 522 are shown, followed by non-used reception periods 524, 525, 526, and non-used transmission periods 527, 528, 529. Each of the RN reception periods 510, 511, 520, 521, 522 may have an associated symbol. Each of the periods 510-529 is not restricted to a particular number of symbols. Since frames$_{1, 5}$ are active frames, frames$_{1, 5}$ include additional RN reception periods and a RN transmission period over frames$_{2-4}$. Frames$_{2-4}$ maintain a RN reception period at least for periodic paging purposes.

The LN radio 506 is permitted to receive when the RN radio 504 is receiving (RN receiving periods). The LN radio 506 is permitted to transmit or receive during non-used periods, such as the non-used periods 512-515 and 524-529. The LN radio 506 is permitted to transmit when the RN radio 504 is transmitting (RN transmission periods).

For the example of FIG. 12, LN link performance may be compared between a RTS/CTS technique and an interference (activity) reporting technique. In the following example various values are provided. The values are provided as examples only. For the example described, DL subframes include 32 symbols, UL subframes include 15 symbols, inter packet time (gap) is equal to 20 ms. A hybrid automatic repeat request is not used. In other words, forward error correction (FEC) bits are not used. Map duration, such as duration of DL and UL maps of a DL subframe, is approximately 600 μs. RN reception duration is approximately 3.5 ms per frame and RN transmission duration is approximately 1.5 ms per frame.

Continuing with the same example, the available time $T_I$ for LN transmission and/or reception between RN active frames using interference reporting may be determined. The available time $T_I$ is equal to the time associated with each frame $T_F$ (5 ms) minus the time associated with DL and UL maps $T_M$ (600 μs) or 4400 μs. The available time $T_I$ is determined for inactive frames, such as frames$_{2, 3, 4}$, not for active frames$_{1, 5}$.

The available time for LN transmission and/or reception using a RTS/CTS technique $T_{R/C}$ may be determined. The available time $T_{R/C}$ is equal to frame period $T_F$ associated with each frame (5 ms) minus the RN radio reception period $T_R$ associated with each of the inactive frames$_{2-4}$ (3.5 ms) or 1500 μs. For RTS/CTS throughput calculations it is assumed that RN radio reception is active throughout the reception period $T_R$ (3.5 ms). Without activity reporting, the LN radio 506 may not detect when the RN radio 504 is receiving RN packets.

From the above example, the LN packet throughput for interference reporting is equal to $T_I/T_F*C*RATE$ or 4400/5000*3/4*24 Mbps (mega-bits-per-second), which is equal to 15.84 Mbps. C is a constant and RATE is a transmission rate associated with the LN packets. The LN packet throughput for RTS/CTS is equal to $T_{R/C}/T_F*C*RATE$ or 1500/5000*3/4*24 Mbps, which is equal to 5.4 Mbps. For this example LN packet throughput is higher for interference reporting.

In addition to or as alternative to the above-described techniques, coexistence and/or collocation of RN and LN radios may be supported by adjusting LN and/or RN radio transmit power. This may reduce interference between LN and RN signals. The LN radio and/or the RN radio may adjust the corresponding transmission power levels based on communication parameters, such as operating channels of the LN and RN radios, transmit power levels of the RN and LN radios, etc. The transmission power levels of the LN and RN radios may also be adjusted based interference or activity reporting.

Bluetooth IEEE 802.11 AMP systems may include coexistence mechanisms for collocated local network radios. The coexistence mechanisms may include the use of request-to-send/clear-to-send (RTS/CTS) techniques to protect BR/EDR traffic. The co-existence mechanisms also include the use of activity reporting to provide a remote device with a BR/EDR schedule of a SRD. The BR/EDR schedule may indicate periodic transmission and/or reception of the SRD. The embodiments described herein provide coexistent mechanisms for collocated remote and local network radios, which include RTS/CTS and activity reporting techniques.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A coexistent communication system of a first network device, the coexistent communication system comprising:
   a first network radio in communication with a base station over a first channel having a first frequency band, wherein the first network radio is configured to operate based on a first network protocol, and wherein the first frequency band includes a Federal Communication band;
   a second network radio in communication with a second network device over a second channel having a second frequency band, wherein (i) the second network radio is collocated with the first network radio, (ii) the second network radio is configured to operate based on a second network protocol different from the first network protocol, and (iii) the second frequency band includes an Industrial, Scientific and Medical band; and
   a control module configured to schedule communication on each of the first channel and the second channel,
   wherein the second network radio is further configured to determine the first frequency band of the first channel,
      in response to the first frequency band of the first channel being higher than the second frequency band of the second channel, select a third channel having a third frequency band lower than the second frequency band of the second channel,
      in response to second frequency band of the second channel being higher than the first frequency of the first channel, select a fourth channel having a fourth frequency higher than the second frequency of the second channel, and transmit a request signal to the second network device, wherein the request signal requests changing the second channel to the selected one of the third channel and the fourth channel.

2. The coexistent communication system of claim 1, wherein the control module is configured to permit the second network radio to receive packets from the second network device when the first network radio is receiving packets from the base station.

3. The coexistent communication system of claim 1, wherein the control module is configured to permit the second network radio to transmit packets to the second network device when the first network radio is transmitting packets to the base station.

4. The coexistent communication system of claim 1, wherein the control module is configured to prevent the first network radio from transmitting packets to the base station when the second network radio is receiving packets from the second network device.

5. The coexistent communication system of claim 1, wherein the control module is configured to determine precedent between the first network radio and the second network radio based on quality of service values for the first network radio and the second network radio.

6. The coexistent communication system of claim 1, wherein the control module is configured to prevent the second network radio from transmitting packets to the second network device when the first network radio receives packets from the base station.

7. The coexistent communication system of claim 1, wherein the second network radio communicates with the second network device based on an activity report, wherein the activity report indicates communication between the first network radio and the base station.

8. The coexistent communication system of claim 1, wherein the second network radio is configured to receive packets from the second network device based on (i) reception of a request-to-send packet from the second network device, and (ii) status of the first network radio.

9. The coexistent communication system of claim 8, wherein the second network radio:
is configured to receive the request-to-send packet when the first network radio is receiving remote network packets; and
does not receive the request-to-send packet when the first network radio is transmitting remote network packets.

10. The coexistent communication system of claim 9, wherein the second network radio is configured to refrain from transmitting a clear-to-send signal when the request-to-send signal is received.

11. The coexistent communication system of claim 9, wherein the second network radio is configured to refrain from transmitting a clear-to-send signal when the first network radio is at least one of transmitting and receiving remote network packets.

12. The coexistent communication system of claim 8, wherein the second network radio is configured to transmit a clear-to-send signal to the second network device based on whether the first network radio at least one of transmits or receives remote network packets within a predetermined period of time.

13. The coexistent communication system of claim 1, further comprising a coexistent interface connected between the first network radio and the second network radio,
wherein the first network radio communicates with the base station based on a permission signal received from the second network radio via the coexistent interface.

14. The coexistent communication system of claim 1, further comprising a coexistent interface connected between the first network radio and the second network radio,
wherein the second network radio communicates with the second network device based on a permission signal received from the first network radio via the coexistent interface.

15. The coexistent communication system of claim 1, wherein one of the first network radio and the second network radio adjusts a transmission power level based on a communication parameter of the other one of the first network radio and the second network radio.

16. The coexistent communication system of claim 1 wherein the first network radio and the second network radio are implemented on an integrated circuit.

17. The coexistent communication system of claim 1, wherein the control module is configured to (i) receive a channel accept signal from the second network device, and (ii) increase separation between transmission frequencies of the first network radio and the second network radio including changing the second channel of the second network radio to one of the third channel and the fourth channel in response to the channel accept signal.

18. The coexistent communication system of claim 1, wherein:
the first network radio is configured to communicate with a network remote from the first network device; and
the second network radio is configured to communicate with a network local to the first network device.

19. A method of operating a coexistent communication system of a first network device, the method comprising:
communicating with a base station over a first channel having a first frequency band via a first network radio, wherein the first network radio is configured to operate based on a first network protocol, and wherein the first frequency band includes a Federal Communication Commission band;
communicating with a second network device over a second channel having a second frequency band via a second network radio, wherein (i) the second network radio is collocated with the first network radio, (ii) the second network radio is configured to operate based on a second network protocol different from the first network protocol, and (iii) the second frequency band includes an Industrial, Scientific and Medical band;
scheduling communication on each of the first channel and the second channel;
determining the first frequency band of the first channel via the second network radio;
in response to the first frequency band of the first channel being higher than the second frequency band of the second channel, selecting, via the second network radio, a third channel having a third frequency band lower than the second frequency band of the second channel;
in response to second frequency band of the second channel being higher than the first frequency of the first channel, selecting, via the second network radio, a fourth channel having a fourth frequency higher than the second frequency of the second channel; and
transmitting a request signal to the second network device via the second network radio, wherein the request signal requests changing the second channel to the selected one of the third channel and the fourth channel.

* * * * *